United States Patent
Winberg et al.

(10) Patent No.: US 9,352,783 B2
(45) Date of Patent: May 31, 2016

(54) VEHICLE CRUSH RAIL WITH SUBSTANTIALLY SQUARE CELLS AND INITIATORS

(71) Applicant: Tesla Motors, Inc., Palo Alto, CA (US)

(72) Inventors: N. Petter Winberg, Hayward, CA (US); Timothy L. Sheldon, Mountain House, CA (US); Sachin Shrimant Sawant, Newark, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 14/255,871

(22) Filed: Apr. 17, 2014

(65) Prior Publication Data

US 2015/0298633 A1    Oct. 22, 2015

(51) Int. Cl.
| B60R 19/34 | (2006.01) |
| B62D 21/15 | (2006.01) |
| B62D 29/00 | (2006.01) |
| F16F 7/12 | (2006.01) |

(52) U.S. Cl.
CPC ............ B62D 21/152 (2013.01); B62D 29/008 (2013.01); F16F 7/12 (2013.01)

(58) Field of Classification Search
CPC ........ B60R 19/34; B60R 19/18; B60R 19/40; B60R 2019/1813; B60R 22/1951; B62D 25/20; B62D 21/152; B62D 25/082; B62D 25/2018; B62D 21/02; B62D 21/15; B62D 21/157; B62D 25/025; B62D 25/2036; B62D 23/00; B62D 23/005; B62D 29/008; B62D 65/00; B62D 65/04
USPC ........... 293/132, 133, 10, 102, 118, 119, 120, 293/121; 296/187.09, 187.12, 187.1, 296/203.02, 187.03, 187.08, 193.06, 296/193.07, 209, 68.1; 280/797, 777, 785, 280/311, 312
See application file for complete search history.

(56) References Cited

U.S. PATENT DOCUMENTS

| 6,361,092 B1 | 3/2002 | Eagle et al. |
| 6,422,632 B1 | 7/2002 | Kamei et al. |
| 6,470,990 B1 | 10/2002 | Panoz |
| 6,672,438 B2 * | 1/2004 | Beck .............................. 188/377 |
| 6,773,044 B2 | 8/2004 | Schambre et al. |

(Continued)

FOREIGN PATENT DOCUMENTS

| DE | 4224489 A1 | 1/1994 |
| DE | 102004034519 B3 | 3/2006 |

(Continued)

OTHER PUBLICATIONS

Ferrari California, undated handout from EuroCarBody engineering conference, believed to have been published in 2012 or earlier, 68 pages.

(Continued)

*Primary Examiner* — Glenn Dayoan
*Assistant Examiner* — Sunsurraye Westbrook
(74) *Attorney, Agent, or Firm* — J. Richard Soderberg

(57) ABSTRACT

A vehicle crush rail includes: a body configured to be at least partially crushed along an axis between first and second ends thereof, the body having a cross section profile that comprises first, second and third cells that are substantially square, wherein at least one of the first, second and third cells extends from the first end to the second end, wherein the first, second and third cells have respective initiators arranged according to a crush pattern for the crush rail.

18 Claims, 3 Drawing Sheets

(56) References Cited

U.S. PATENT DOCUMENTS

| | | | |
|---|---|---|---|
| 6,820,924 B2 | 11/2004 | Caliskan et al. | |
| 8,210,601 B2 * | 7/2012 | Terada et al. | 296/187.09 |
| 2001/0049916 A1 * | 12/2001 | Rillie et al. | 52/200 |
| 2002/0101086 A1 * | 8/2002 | Koch et al. | 293/133 |
| 2004/0201256 A1 | 10/2004 | Caliskan et al. | |
| 2007/0181393 A1 * | 8/2007 | Suzuki | 188/377 |
| 2008/0106107 A1 * | 5/2008 | Tan et al. | 293/133 |
| 2012/0175897 A1 | 7/2012 | Rawlinson et al. | |
| 2012/0175898 A1 | 7/2012 | Gadhiya et al. | |
| 2012/0175900 A1 | 7/2012 | Rawlinson | |
| 2013/0088045 A1 | 4/2013 | Charbonneau et al. | |
| 2013/0161933 A1 | 6/2013 | Marten et al. | |
| 2013/0300138 A1 | 11/2013 | Banasiak et al. | |

FOREIGN PATENT DOCUMENTS

| | | |
|---|---|---|
| GB | 2503095 A | 12/2013 |
| WO | WO 9932346 A1 | 7/1999 |

OTHER PUBLICATIONS

2013 Audi A8 Body Structure, Boron Extrication, http://boronextrication.com/2013/03/2013-audi-a8-body-structure/, Feb. 5, 2014, 10 pages.

International search report in application PCT/US2015/026310, Jul. 28, 2015, 11 pages.

* cited by examiner

VEHICLE CRUSH RAIL WITH SUBSTANTIALLY SQUARE CELLS AND INITIATORS

BACKGROUND

Vehicles are generally designed with an eye toward the possibility of forceful impact, whether that be the result of the vehicle hitting another stationary or moving object, or due to the vehicle being run into by something (e.g., another vehicle). For this reason, crash-absorbing structures can be provided in the front and rear of the vehicle

SUMMARY

In a first aspect, a vehicle crush rail includes: a body configured to be at least partially crushed along an axis between first and second ends thereof, the body having a cross section profile that comprises first, second and third cells that are substantially square, wherein at least one of the first, second and third cells extends from the first end to the second end, wherein the first, second and third cells have respective initiators arranged according to a crush pattern for the crush rail.

Implementations can include any or all of the following features. The initiators comprise indentations in the body. At least one of the indentations has two parallel edges joined by rounded portions. At least one of the indentations is located on an outer surface of the body. At least one of the indentations comprises a swage. At least some of the initiators are staggered relative to each other. The crush pattern extends over respective faces of the cells, and wherein the staggering comprises that initiators on adjacent faces are staggered along the axis. The cross section profile comprises the first, second and third cells positioned in a row; the first cell has first initiators on opposite faces thereof and a second initiator on a face between the opposite faces thereof, the first initiators adjacent the first end and the second initiator spaced from the first end; the second cell has third initiators on opposite faces thereof, the third initiators adjacent the first end; and the third cell has fourth initiators on opposite faces thereof and a fifth initiator on a face between the opposite faces thereof, the fourth initiators adjacent the first end and the fifth initiator spaced from the first end. The vehicle crush rail is mounted at a front end of a vehicle. The front end has a bumper system mounted to at least two vehicle crush rails. The bumper system is mounted to end plates on the respective vehicle crush rails, wherein the end plates allow the bumper system to be positioned at a specified height above a driving surface. The vehicle crush rail is mounted in an upright position at the front end and has an opening through which a drive shaft passes. The vehicle crush rail is configured to hold a vehicle subframe. The body comprises an aluminum extrusion. The cross section profile comprises the first, second and third cells positioned in a row. The crush pattern comprises a common deformation mode throughout the length of the vehicle crush rail. The deformation mode comprises alternating portions of inward deformations and outward deformations in the body. The inward deformations and outward deformations appear in crush sections, a first crush section having, on each side of the vehicle crush rail, two inward deformations and one outward deformation therebetween, and a second crush section adjacent the first crush section having, on each side of the vehicle crush rail, two outward deformations and one inward deformation therebetween.

DETAILED DESCRIPTION

This document describes examples of systems and techniques for providing a crush rail section in a vehicle. The crush rail can have a cross-section profile with three substantially square cells, and can be configured with one or more initiators to provide a crush pattern of partially or completely collapsing the rail in the event of impact.

Figure 1:
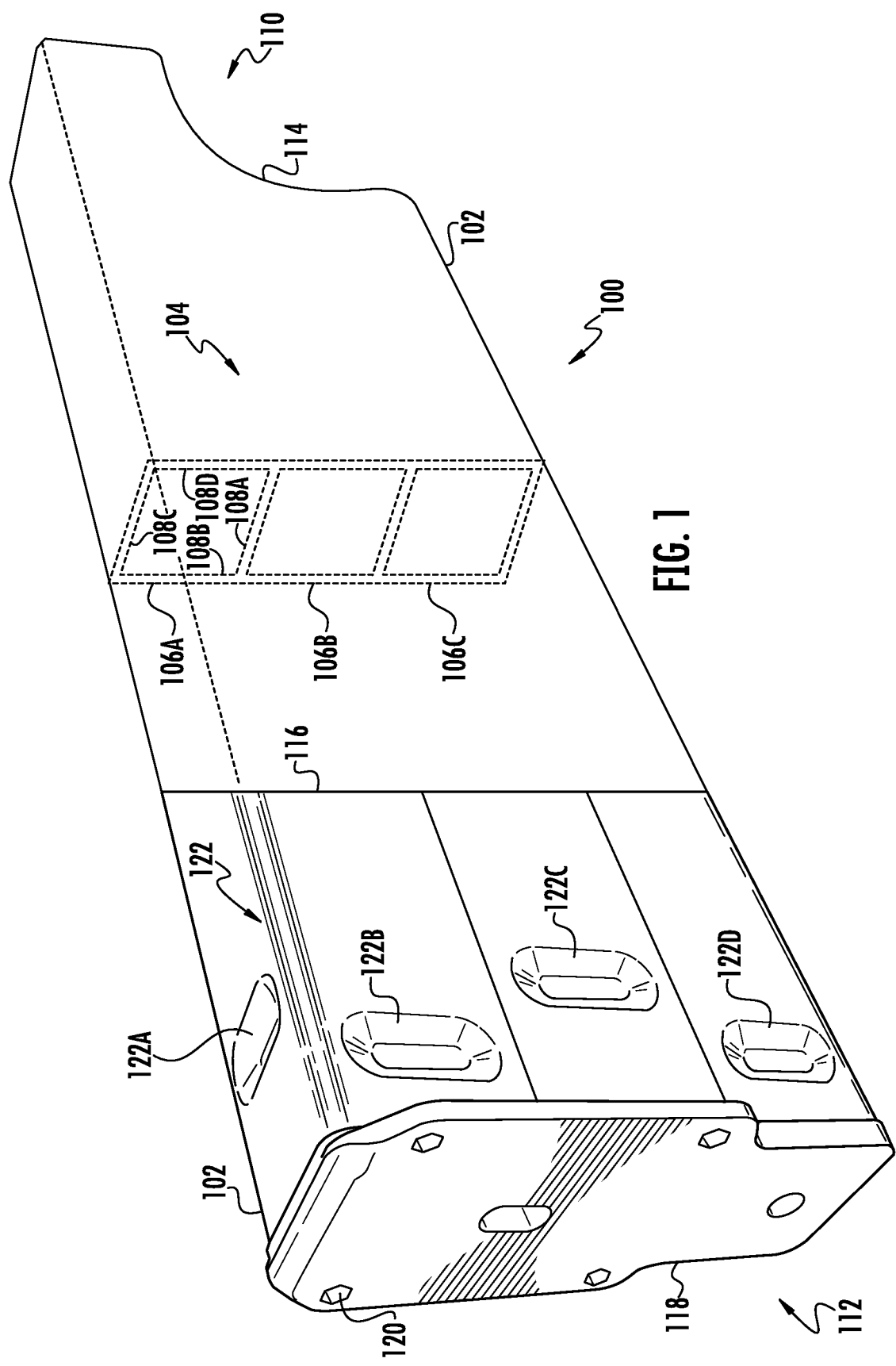
FIG. 1 shows an example of a vehicle crush rail.

FIG. 1 shows an example of a vehicle crush rail 100. The rail comprises an elongate body 102 that in this example is manufactured as an extrusion, including, but not limited to, an aluminum extrusion. In this implementation, the rail is intended for installation in a front end of a vehicle where it forms part of a frontal impact protection system. For example, such a system can provide protection if the vehicle's front end collides with an object, or if something hits the vehicle from the front.

In other implementations, a vehicle crush rail can also or instead be used elsewhere than in the front end of a vehicle. For example, and without limitation, a crush rail can be positioned at the rear and/or on one or more sides of the vehicle.

The vehicle crush rail 100 has a cross-section profile 104 for at least part of its length. In this example, the cross-section profile provides the crush rail with three internal cells 106A-C. That is, the crush rail in this implementation has a partially hollow interior with particular structure provided by the cells. In this implementation, each of the cells is substantially square. For example, the cell 106A is here defined by four inward facing surfaces 108A-D that are of substantially the same width as each other. Surfaces 108A and 108C are here substantially parallel to each other, and surfaces 108B and 108D are substantially parallel to each other. In the corners between any adjacent ones of the surfaces 108A-D, the material can have a rounded shape so as to provide increased structural integrity and durability.

Having the three cells 106A-C formed in the crush rail can help its stability around a lateral bending axis during folding, and can allow flexible positioning of other components that are part of a crash protection system. Examples thereof will be described below. As another example, the thickness of the walls in the cross-section profile 104 can be selected for a particular implementation, such as based on the vehicle's mass and/or energy absorption requirements.

In this implementation, the vehicle crush rail 100 has a rear end 110 and a front end 112. Generally, the longitudinal axis between the front and rear ends corresponds to the direction in which the crush rail can be partially or completely collapsed in the event of impact. Here, the rear end has a cutout 114 so as to conform to the shape of other structures in the vehicle against which the crush rail will abut.

A line 116 on the vehicle crush rail 100 is here provided for illustrative purposes only. It marks the boundary between the illustration of, on the one hand, external features of the crush rail (here at the front end 112), and on the other hand, internal features (here the cross-section profile 104). When the vehicle crush rail 100 is implemented, the external appearance here shown at the front end can continue over some or all of the remainder of the crush rail.

The vehicle crush rail 100 has an end plate 118 at the front end 112. In some implementations, the end plate can be a generally flat member configured to be mounted against the openings formed by the three cells 106A-C. For example, the end plate can have at least one flange configured to fit inside at least one of the openings of the cells. The end plate can be configured to have another vehicle component mounted thereto, such as by way of one or more openings 120 for a bolt or other fastener.

The vehicle crush rail 100 can have one or more initiators 122 configured to initiate a particular crush pattern for the crush rail. The initiators can do so by triggering a natural frequency of folding while reducing the risk of initiating cracks in the crush rail. The natural frequency of folding, i.e., the wavelength of individual folds, is given by a relation between cell wall thickness, cell wall width and material parameters. For example, the presence of one or more initiators can initiate crushing/folding at a lesser force level than would be required without the initiator(s). The initiators are positioned near the end of the crush rail at which crushing is expected to begin (here, at the front end).

In some implementations, one or more of the initiators can comprise a swage or other indentation into the body of the crush rail. For example, such indentation(s) can be provided on the outside and/or inside of the crush rail. In this implementation, the indentations have a generally oval shape. For example, two sides of the indentation can be substantially parallel to each other and joined by rounded portions.

The initiators 122 can be arranged in a staggered configuration. For example, initiators 122A and B are here positioned on two adjacent outward faces of the cell 106A. Moreover, the initiators 122A-B are staggered with respect to each other: the initiator 122A is further from the end plate 118 than is the initiator 122B.

Similarly, an initiator 122C is positioned on an outward face of the cell 106B that is adjacent an outward face of the cell 106C on which an initiator 122D is positioned. For example, the relative positions of staggered initiators along the crush rail are given by a distance derived from half the wavelength for natural folding. The initiators 122C-D are also staggered with respect to the other initiators: the initiator 122C is further from the end plate 118 than is the initiator 122D. In this example, the initiators 122A and 122C are positioned about the same (longer) distance from the end plate; the initiators 122B and 122D, in turn, are positioned about the same (shorter) distance from the end plate.

The external surfaces of the vehicle crush rail 100 not visible in this view can also have one or more initiators. For example, an initiator corresponding to the initiator 122B can be located on the external face that is at the opposite side of the cell 106A. Such initiator can have the same staggering as the initiator 122B; here, closer to the end plate 118. As another example, an initiator corresponding to the initiator 122C can be located on the external face that is at the opposite side of the cell 106B. Such initiator can have the same staggering as the initiator 122C; here, further from the end plate. In an analogous way, initiators corresponding to the initiators 122A and 122D can also or instead be located on the faces that are opposite to their respective faces.

Figure 2:
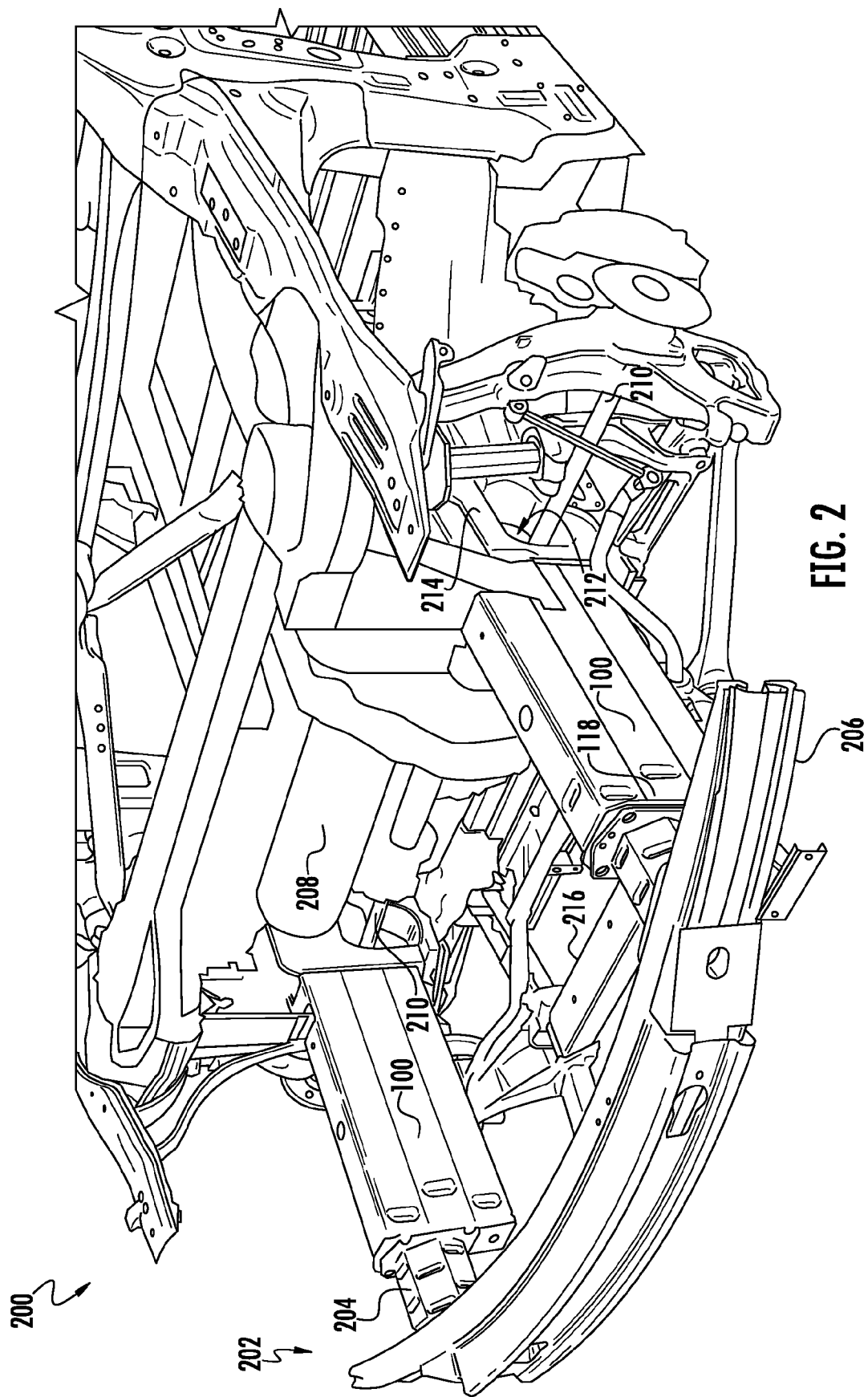
FIG. 2 shows an example of a vehicle front end having two instances of the crush rail of FIG. 1.

FIG. 2 shows an example of a vehicle front end 200 having two instances of the crush rail 100 of FIG. 1. In this implementation, the crush rails serve as a forward extension of the vehicle's frame system. For example, the crush rails can be configured to have a bumper system 202 mounted thereon. Here, the bumper system comprises respective crush cans 204 mounted on each of the crush rails, and a bumper beam 206 mounted on the crush cans. Additional elements (not shown) can optionally be part of the bumper system, such as fascia or other cosmetic elements that match the vehicle's body color and/or surface ornamentation.

The vehicle crush rail 100 can provide flexible placement of bumper components, such as of the bumper system 202. In some implementations, the end plate 118 can offer several alternative ways of positioning the crush cans 204 or another component. For example, two different vehicle models (e.g., a sedan and a sport utility vehicle) might have different sizes of their front wheels and/or other aspects of the vehicle front end, which can lead to one of the models having its respective crush rails higher or lower above the road surface than the other model. However, the forward-facing bumper (here, the bumper beam 206) may need to be positioned at the same height above the road surface in both models, for example due to regulations or other safety protocols. Accordingly, the flexible placement of the crush cans onto the crush rails (e.g., by way of different positioning on the end plate 118) can provide useful flexibility.

In this example, the vehicle front end 200 also features a front motor 208 that provides traction of the vehicle's front wheels by way of one or more drive shafts 210. The front motor can operate according to any suitable technique. In some implementations, the front motor is an electric motor that is powered by an energy storage in the vehicle, such as a battery pack of rechargeable cells (e.g., lithium-ion cells). For example, the front motor can be paired with another motor configured to drive the rear wheels of the vehicle. As another example, the front motor may be the only traction unit of the vehicle.

Referring now briefly to both FIGS. 1 and 2, the vehicle crush rail 100 can allow the drive shaft(s) 210 to pass through the force path that occurs in the event of impact, and thereby accommodate both normal vehicle operation and crash safety. In some implementations, the cutout 114 in the crush rail can facilitate the creation of an opening 212 that allows the drive shaft to pass through. For example, this can be done by an adapter component 214 against which the crush rail abuts and that allows crush forces to pass around the drive shaft and impact on designated structures further back in the vehicle (e.g., a torque box). The crush rail can be configured so that at least one of the cells 106A-C (e.g., the cell 106A) extends to the end of the crush rail (e.g., past the opening 212), and so that at least another one of the cells (e.g., the cells 106B-C) ends before the opening (e.g., against a front of the adapter component 214).

Another aspect of the vehicle crush rail 100 is that it can serve as one attachment point for a sub-frame 216. For example, the sub-frame can be configured to carry certain components involved in the vehicle's operation, including, but not limited to, steering components (e.g., a steering rack), pumps and/or compressors. During normal vehicle operation, at least one part of the sub-frame (e.g., the front) can be held in place by the crush rail. In the event of an impact, the crush rail can not only undergo controlled crushing itself, but can also facilitate a desirable deformation of the sub-frame so as to lessen the crash impact of the component(s) mounted thereon. For example, the crush rail can do so by allowing the sub-frame to break free from its attachment to the crush rail, thereby permitting a downward deformation of the sub-frame.

Figure 3:
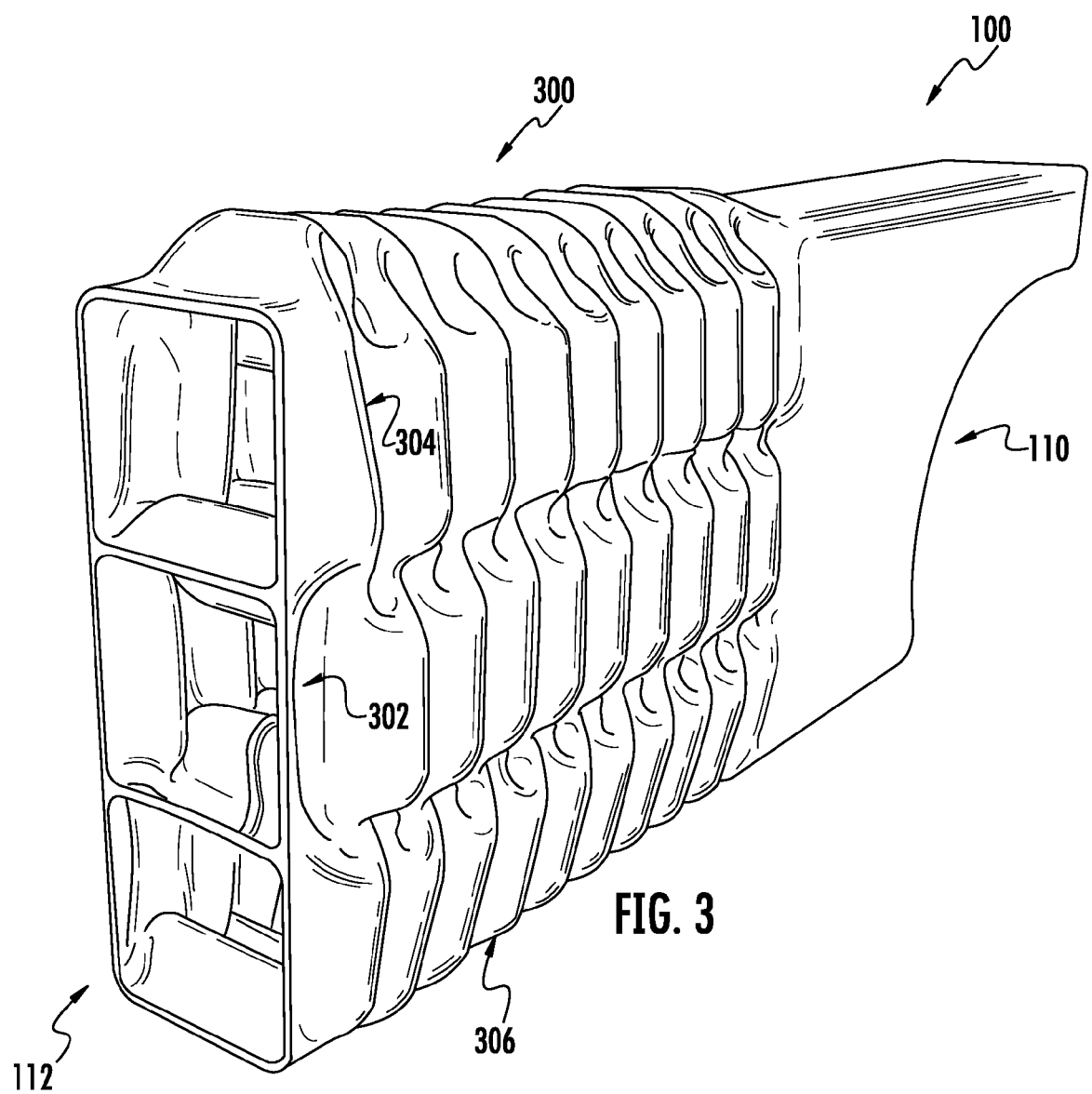
FIG. 3 shows an example of the vehicle crush rail from FIG. 1 in a crushed state.

FIG. 3 shows an example of the vehicle crush rail 100 from FIG. 1 in a crushed state. The crush rail is here shown without the end plate at the front end 112 so that part of the interior of the crush rail is visible. The crushed state illustrates what the crush rail might look like after an impact at the front end.

As illustrated in this example, the force of the front impact has caused a crush pattern 300 to occur in part of the vehicle crush rail 100. The crush pattern in this example exhibits relatively short wavelength folding. For example, this can serve to reduce the oscillations in the experienced force, and/or provide a relatively high ratio of absorbed energy to peak force. Moreover, the crush pattern looks essentially similar throughout an entire portion of the crush rail starting at the front end 112 and extending part of the way toward the rear end 110. That is, the crush rail is here configured so that the crush pattern would continue essentially all the way to the end of the crush rail if the force were applied continuously.

The crush pattern is given by the physical dimensions and material as mentioned above. Initiators can be used to ensure that the folding is initiated in this first order folding mode in a robust manner. That is, the shape, orientation and/or placement pattern of the initiators can cause the crush rail to deform according to the crush pattern. This can reduce the risk of fracturing and lower the initial peak force for initiating the folding closer to the peak force in the oscillating force derived by the folding process.

In this example, the crush pattern includes alternating portions of inward deformations 302 and outward deformations 304. That is, the crush pattern is seen to have multiple crush sections 306 occurring next to each other. Referring to the side of the crush rail (i.e., the external surface in FIG. 1 on which the initiators 122B-D are located), one of the crush sections can have two of the outward deformations with one of the inward deformations in between. As another example (again given with regard to the side of the crush rail), one of the crush sections can have two of the inward deformations with one of the outward deformations in between.

In other implementations, the shape, orientation and/or placement pattern of initiators can provide the crush rail with another crush pattern. For example, the number of initiators, the size or depth thereof, and/or the relative staggering between initiators can be varied.

A number of implementations have been described as examples. Nevertheless, other implementations are covered by the following claims.

What is claimed is:

1. A vehicle crush rail comprising:
a body configured to be at least partially crushed along an axis between first and second ends thereof, the body having a cross section profile that comprises first, second and third cells that are substantially square, wherein at least one of the first, second and third cells extends from the first end to the second end, wherein the first, second and third cells have respective initiators arranged according to a crush pattern for the crush rail.

2. The vehicle crush rail of claim 1, wherein the initiators comprise indentations in the body.

3. The vehicle crush rail of claim 2, wherein at least one of the indentations has two parallel edges joined by rounded portions.

4. The vehicle crush rail of claim 2, wherein at least one of the indentations is located on an outer surface of the body.

5. The vehicle crush rail of claim 2, wherein at least one of the indentations comprises a swage.

6. The vehicle crush rail of claim 1, wherein at least some of the initiators are staggered relative to each other.

7. The vehicle crush rail of claim 6, wherein the crush pattern extends over respective faces of the cells, and wherein the staggering comprises that initiators on adjacent faces are staggered along the axis.

8. The vehicle crush rail of claim 7, wherein:
the cross section profile comprises the first, second and third cells positioned in a row;
the first cell has first initiators on opposite faces thereof and a second initiator on a face between the opposite faces thereof, the first initiators adjacent the first end and the second initiator spaced from the first end;
the second cell has third initiators on opposite faces thereof, the third initiators spaced from the first end; and
the third cell has fourth initiators on opposite faces thereof and a fifth initiator on a face between the opposite faces thereof, the fourth initiators adjacent the first end and the fifth initiator spaced from the first end.

9. The vehicle crush rail of claim 1, mounted at a front end of a vehicle.

10. The vehicle crush rail of claim 9, wherein the front end has a bumper system mounted to at least two vehicle crush rails.

11. The vehicle crush rail of claim 10, wherein the bumper system is mounted to end plates on the respective vehicle crush rails, wherein the end plates allow the bumper system to be positioned at a specified height above a driving surface.

12. The vehicle crush rail of claim 9, mounted in an upright position at the front end and having an opening through which a drive shaft passes.

13. The vehicle crush rail of claim 9, configured to hold a vehicle subframe.

14. The vehicle crush rail of claim 1, wherein the body comprises an aluminum extrusion.

15. The vehicle crush rail of claim 1, wherein the cross section profile comprises the first, second and third cells positioned in a row.

16. The vehicle crush rail of claim 1, wherein the crush pattern comprises a common deformation mode throughout the length of the vehicle crush rail.

17. The vehicle crush rail of claim 16, wherein the deformation mode comprises alternating portions of inward deformations and outward deformations in the body.

18. The vehicle crush rail of claim 17, wherein the inward deformations and outward deformations appear in crush sections, a first crush section having, on each side of the vehicle crush rail, two inward deformations and one outward deformation therebetween, and a second crush section adjacent the first crush section having, on each side of the vehicle crush rail, two outward deformations and one inward deformation therebetween.

* * * * *